Feb. 26, 1957 S. RUBEN 2,783,292
PRIMARY CELL
Filed Dec. 24, 1952
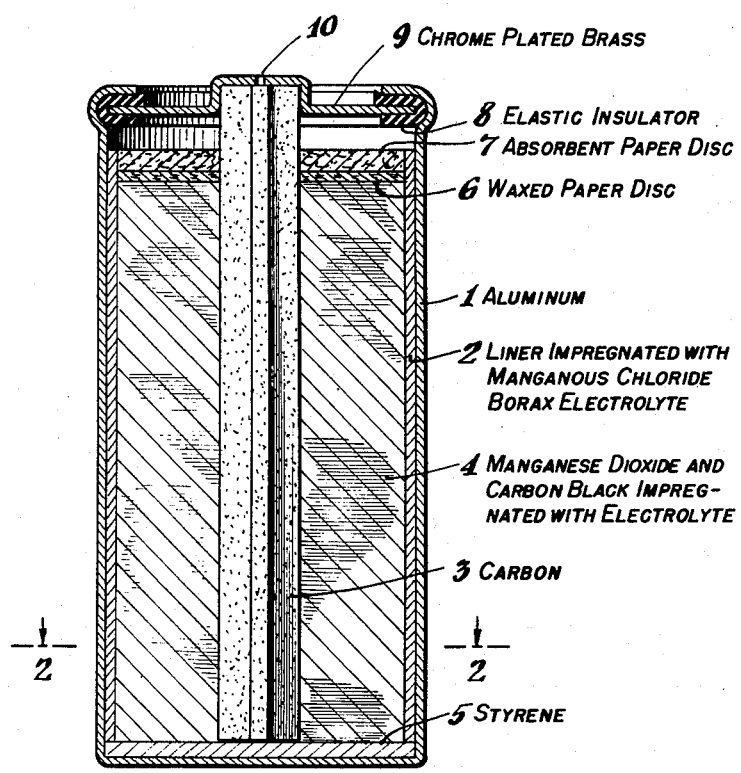
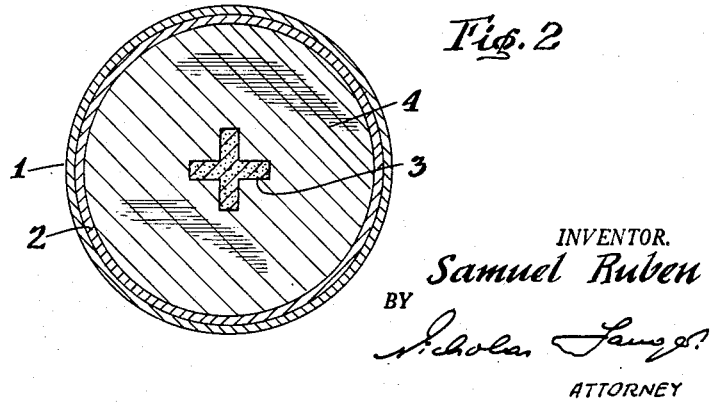
INVENTOR.
Samuel Ruben
BY
ATTORNEY

United States Patent Office 2,783,292
Patented Feb. 26, 1957

2,783,292
PRIMARY CELL

Samuel Ruben, New Rochelle, N. Y.

Application December 24, 1952, Serial No. 327,823

6 Claims. (Cl. 136—100)

This invention relates to primary cells and particularly to galvanic cells utilizing aluminum as the anode. The present application is a continuation in part of my copending application, Serial No. 214,327 filed March 7, 1951, now Patent No. 2,638,489, dated May 12, 1953.

The general object of the invention is the provision of a dry cell which does not require the use of zinc or mercury and which will be competitive in cost with commercial Le Clanche type cells.

A further object is the provision of an aluminum anode primary cell which can be stored for extended periods of time without deterioration and which provides long and continuous operation.

Another object is the provision of an aluminum anode primary cell capable of supplying current over sustained periods without excessive polarizing effects.

A specific object of the invention is the provision of novel electrolytes for primary cells employing aluminum anodes, and which will allow electrolytic reduction of a depolarizer compound, such as manganese dioxide.

Other and further objects and advantages of the present invention will become apparent from the following description, taken in conjunction with the accompanying drawing, in which:

Fig. 1 is a vertical sectional view, having parts in elevation of a cell structure embodying the invention; and Fig. 2 is a horizontal cross-sectional view taken on line 2—2 of Fig. 1.

Because of its high electrochemical equivalence and other desirable characteristics, including abundant availability, many attempts have been made to utilize aluminum in place of zinc; one gram of aluminum will deliver 2.98 ampere hours compared with 0.819 ampere hour available from one gram of zinc; but to date, no dry cells employing aluminum anodes have appeared on the market, although the supply of zinc has been steadily diminishing, while the supply of aluminum has been steadily increasing.

I have found a combination of cell elements which provides a cell of desirable properties. My invention, in its preferred form, comprises an electric current producing cell employing an anode of aluminum, an electrolyte comprising an aqueous solution of manganous chloride ($MnCl_2 4H_2O$) and a borate, and a suitable depolarizer, preferably manganese dioxide.

In my co-pending application above referred to, Serial No. 214,327, I describe a primary cell employing an aluminum anode, an electrolyte of manganous chloride and a depolarizer of manganese dioxide. I have now found that the manufacture of the cell is facilitated by the addition of a small quantity of borax ($NaB_4O_7$) to the manganous chloride and that the electrolyte impregnated bobbin may be formed and handled without corrosion of the steel tools.

In order to obtain adequate anodic corrosion of aluminum for the generation of current, an electrolyte of acidic characteristics is required, such as a salt which will hydrolize in solution to an acidic electrolyte. The preferred concentration range of my manganous chloride electrolyte is approximately 20% to 60%. In adding borax to the manganous chloride solution, a sufficient quantity is added to bring the pH of the electrolyte to a range of approximately 5 to 5.6, the amount of borate added being preferably the maximum amount that can be added without precipitation of the manganous component.

For normal temperature operation, the electrolyte is made by adding to each 24 cc. of an aqueous 50% manganous chloride solution, 11.4 cc. of a 50 gram per liter borax solution. This reduces the manganous chloride solution to the desired concentration and adds an adequate amount of borax which acts in a buffer capacity to increase the pH of the solution. For low temperature operation, a higher concentration of manganous chloride is used.

The addition of the borax does not affect the operation of the cell and permits more practical handling of the electrolyte during manufacture of the cell.

For the depolarizer I prefer to use a mixture of 85% synthetic manganese dioxide and 15% acetylene carbon black.

While manganous chloride is the preferred electrolyte base, manganese bromide, and the chlorides, fluorides and bromides of nickel and cobalt with an inhibitor, may also be used, though less desirable. The preferred corrosion inhibitor is a chromate, such as potassium dichromate. A small amount, such as .015%, may be added to the electrolytes to reduce airline corrosion effects, particularly when nickel or cobalt chloride is used as the electrolyte.

The cell may be made in structures similar to those of standard Le Clanche cells or in other structures as are shown in my various cell patents and co-pending applications.

The drawing illustrates a suitable structure in which the container 1 comprises an aluminum cup having a paper liner 2, the container serving as the anode and negative terminal. The liner may consist of two turns of a calendared porous paper to which a small quantity of the manganous chloride-borax electrolyte has been added. In the manufacture of a "D" size cell, the extruded cross-shaped carbon rod 3 is forced into depolarizer bobbin 4 consisting of 35 grams of a mixture of six parts of electrolytic manganese dioxide and one part of Shawinigan carbon black. Before forming the bobbin, 20.5 cc. of the manganous chloride-borax electrolyte is added to the mixture. The shape of the extruded carbon rod and the resultant large contacting surface area are of considerable importance, it having been found that round carbon rods lose their contact due to the relaxation of pressure between the rod and the bobbin. At the bottom of the container 1, and resting on the paper liner 2, is styrene disc 5 on which the bobbin and carbon rod rest and which prevents shorting, which might otherwise take place during consolidation of the bobbin into the can. Resting on top of the bobbin 4 are waxed paper disc 6 and absorbent paper disc 7 which serve to retain any free electrolyte which may be discharged above the top of the bobbin. The waxed paper disc 6 or other suitable inert non-electrolyte absorbing member serves to keep the paper disc 7 out of direct contact with the bobbin so that undesired absorption of electrolyte from the bobbin is prevented. In consolidating the bobbin into the can, sufficient pressure is used to insure adequate conductivity. Contact to the carbon rod which extends above the bobbin, is made by chrome plated brass cap 9 serving as the positive terminal and closure of the cell. Grommet 8 insulates the top from the aluminum container and vent hole 10 in top 9 permits the discharge of any gas which may be generated in the cell.

The potential of the cell employing the manganous chloride-borax electrolyte is 1.54 volts. Where the bromides of manganese, nickel or cobalt are utilized as the electrolyte base, the potential of the cell will be lower. When the bromides are employed, natural manganese dioxide is used, as the synthetic is too active.

The invention lends itself to many other battery structures, both wet and dry in plastic or metal cases. Where a plastic case is used the anode may desirably be made in the form of a perforated aluminum cylinder or cup lining the inside surface of the container. Increased anode area may be obtained by various methods such as spraying etching, sintering of powders, etc.

As used herein, the term "aluminum" is meant to include aluminum and alloys of aluminum which do not deleteriously react with the chloride electrolytes.

I claim:

1. An electric current producing cell comprising an anode of aluminum, an electrolyte composed of an aqueous solution of a halogen salt of an element selected from the group consisting of manganese, nickel and cobalt plus a borate of an alkali metal, said electrolyte having a pH between 5 and 5.6, and a depolarizer.

2. The cell of claim 1 characterised by the addition of a corrosion preventive inhibitor.

3. The cell of claim 1 characterised by the addition of a fractional percentage of a chromate.

4. An electric current producing cell comprising an anode of aluminum, an electrolyte composed of an aqueous solution of manganous chloride and a borate of an alkali metal, said electrolyte having a pH between 5 and 5.6, and a depolarizer.

5. An electric current producing cell comprising an anode of aluminum, an electrolyte comprising an aqueous solution of manganous chloride and sodium borate, said electrolyte having a pH between 5 and 5.6, and a depolarizer comprising manganese dioxide.

6. A primary cell having an anode comprising aluminum, a depolarizer comprising electrolytic manganese dioxide, and an electrolyte comprising an aqueous solution of manganous chloride of a concentration between 20% and 60%, said electrolyte containing a substantial quantity of borax insufficient to precipitate the manganous component thereof but adequate to raise the pH to at least 5.

References Cited in the file of this patent

UNITED STATES PATENTS

| | | |
|---|---|---|
| 390,748 | Brewer | Oct. 9, 1888 |
| 706,631 | Anderson | Aug. 12, 1902 |
| 1,008,860 | Peek | Nov. 14, 1911 |
| 1,140,826 | Hoppie | May 25, 1915 |
| 1,316,836 | Garaca | Sept. 23, 1919 |
| 1,978,624 | Colloseus | Oct. 30, 1934 |
| 2,542,934 | MacFarland | Feb. 20, 1951 |
| 2,552,091 | Glover | May 8, 1951 |

FOREIGN PATENTS

| | | |
|---|---|---|
| 2,234 of 1884 | Great Britain | Oct. 24, 1884 |
| 2,361 of 1893 | Great Britain | Mar. 25, 1893 |
| 199,309 | Great Britain | June 21, 1923 |
| 882,522 | France | June 7, 1943 |